(12) United States Patent
Perakes et al.

(10) Patent No.: US 7,617,902 B2
(45) Date of Patent: Nov. 17, 2009

(54) BIASING DRIVE TORQUE TO A SECONDARY AXLE IN A MOTOR VEHICLE POWERTRAIN

(75) Inventors: Andreas E. Perakes, Canton, MI (US); Samuel Ellis, Manifold Heights (AU)

(73) Assignee: Ford Global Technologies, LLC, Dearborn, MI (US)

( * ) Notice: Subject to any disclaimer, the term of this patent is extended or adjusted under 35 U.S.C. 154(b) by 532 days.

(21) Appl. No.: 11/485,009

(22) Filed: Jul. 12, 2006

(65) Prior Publication Data

US 2007/0256875 A1 Nov. 8, 2007

Related U.S. Application Data

(63) Continuation-in-part of application No. 11/418,859, filed on May 5, 2006, now Pat. No. 7,600,598.

(51) Int. Cl.
*B60K 17/35* (2006.01)
(52) U.S. Cl. .................................... 180/248
(58) Field of Classification Search ............... 180/233, 180/247, 248, 249
See application file for complete search history.

(56) References Cited

U.S. PATENT DOCUMENTS

| | | | |
|---|---|---|---|
| 4,967,869 A | 11/1990 | Nagaoka et al. | |
| 4,981,190 A | 1/1991 | Nakayama et al. | |
| 5,168,955 A | 12/1992 | Naito | |
| 5,599,075 A * | 2/1997 | Hara et al. | 303/143 |
| 5,927,425 A * | 7/1999 | Kusano | 180/248 |
| 6,663,536 B1 | 12/2003 | Meier | |
| 6,712,730 B2 | 3/2004 | Gradu | |
| 6,755,762 B2 | 6/2004 | Gradu | |
| 6,817,434 B1 | 11/2004 | Sweet et al. | |
| 6,923,514 B1 | 8/2005 | Spieker et al. | |
| 7,082,358 B2 * | 7/2006 | Sugo | 701/33 |
| 7,175,559 B2 * | 2/2007 | Bowen | 475/225 |
| 7,383,910 B2 * | 6/2008 | Mori et al. | 180/245 |
| 7,386,383 B2 * | 6/2008 | Yoneda et al. | 701/69 |
| 7,422,537 B2 * | 9/2008 | Gradu | 475/201 |
| 7,503,416 B2 * | 3/2009 | Sharma et al. | 180/247 |
| 2003/0125157 A1 | 7/2003 | Phelan et al. | |
| 2005/0266953 A1 | 12/2005 | Puiu | |
| 2006/0000685 A1 | 1/2006 | Puiu | |

* cited by examiner

*Primary Examiner*—Kevin Hurley
(74) *Attorney, Agent, or Firm*—David B. Kelley; MacMillan, Sobanski & Todd, LLC

(57) ABSTRACT

A method for transmitting power to the wheels of a motor vehicle includes driveably connecting an output of a transmission to a first set of wheels, varying the magnitude of torque transmitted to an input of a differential mechanism, varying the speed of the input of the first differential mechanism, and driveably connecting the differential mechanism to the wheels of a second wheel set.

4 Claims, 1 Drawing Sheet

BIASING DRIVE TORQUE TO A SECONDARY AXLE IN A MOTOR VEHICLE POWERTRAIN

CROSS-REFERENCE TO RELATED APPLICATION

This application is a continuation-in-part of the U.S. patent application Ser. No. 11/418,859, filed May 5, 2006 U.S. Pat. No. 7,600,598.

BACKGROUND OF THE INVENTION

This invention relates generally to a system and method for transmitting power to the wheels of a motor vehicle.

Vehicle drive systems in the prior art employ an on/off braking device, which changes the transmission ratio between front driven axles and rear driven axles. Other systems use a mismatch in final drive ratios and controllable braking devices, i.e. two or more brakes, to vary the magnitude of torque transmitted to the driven axles.

In the prior art, the speed and torque transmitted to the left and right rear wheels are controlled by a differential mechanism having two slipping brakes (electromagnetic or hydraulic), one for the right axle shaft, the other brake for the left axle shaft.

U.S. Pat. No. 4,981,190 discloses a four wheel drive vehicle that directs torque to desired wheels by using a brake system. The brake system includes a brake control unit for controlling disk brakes. If one of the wheels slips, the brake control unit stops the slip and sends torque to other wheels.

U.S. Pat. No. 6,712,730 discloses a torque coupling that connects the secondary driving wheels of an automotive vehicle indirectly to the power unit of the vehicle through a variable torque coupling, while the primary driving wheels on the vehicle are connected directly to the power unit. The coupling compensates for variations in the angular velocity of the primary and secondary wheels while still transferring torque to the secondary wheels. The coupling includes a magnetic particle brake organized about an axis and a planetary gear set organized about the same axis. The coupling has two paths through which the torque is transferred, one a mechanical path and the other a brake path. Most of the torque is transferred through the mechanical path, while the brake path accommodates for slippage and controls the proportion of torque delivered to the secondary wheels, with the control being solely dependent on the magnitude of the current directed through the brake.

It would be desirable to provide a system and method for varying the magnitude of torque transmitted to the input of a differential mechanism and adjusting the magnitude of differential torque applied to the left and right rear wheels by controlling wheel brake torque at each of the rear wheels in accordance with current vehicle handling requirements.

SUMMARY OF THE INVENTION

A system embodiment provides continuous, smooth variation of torque transmission ratio in a single, compact unit. The drive system transmits torque continuously to a first wheel set, preferably the front vehicle wheels, and a variable torque magnitude on-demand preferably to the rear wheels. The engine and transaxle are preferably disposed transversely and located in the engine compartment at the front of the vehicle.

A method embodiment for transmitting power to the wheels of a motor vehicle includes driveably connecting an output of a transmission to a first set of wheels and producing a first axle speed ratio, varying the magnitude of torque transmitted to an input of a differential mechanism, varying the speed of the input of the first differential mechanism such that a second axle speed ration substantially equal to the first axle speed ratio is produced, and driveably connecting the differential mechanism to the wheels of a second wheel set. The magnitude of drive torque transmitted from the first differential mechanism differentially to the wheels of the second wheel set is changed by varying the magnitude of brake torque applied to a first wheel of the second wheel set relative to a magnitude of brake torque applied to a second wheel of the second wheel set.

Allowing the brake or grounding element to slip produces a desired matching of the front axle and rear axle speed ratios as required to maintain equivalent traction at both axles. Fully grounding the brake produces a desired enhancement in vehicle handling. Incorporating a variably slipping capacity to the brake adds an additional tuning parameter that allows further enhancement of vehicle handling performance under various conditions without degrading the traction capability of the base AWD system.

The system includes a power transmitting device, located between the transmission output and input of the rear differential, for changing the speed and torque transmitted to a rear differential input. The power transmitting device may include a planetary gearset, whose speed ratio and output torque can be varied by controlling slip across a friction brake. Alternatively, the device may be a brake, whose output speed and torque vary with the degree of slip across the brake. A slipping brake and planetary gear unit can be used in combination to vary torque and speed to the rear differential input.

The scope of applicability of the present invention will become apparent from the following detailed description, claims, and drawings. It should be understood, that the description and specific examples, although indicating preferred embodiments of the invention, are given by way of illustration only. Various changes and modifications to the described embodiments and examples within the spirit and scope of the invention will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
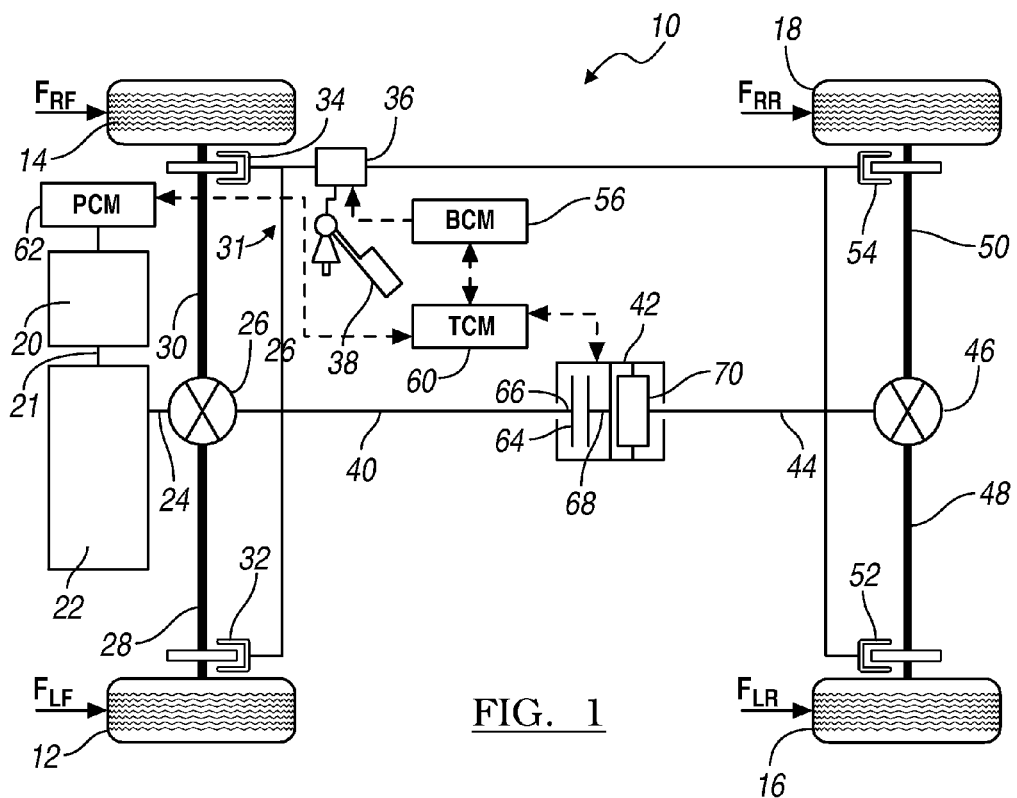
FIG. 1 is a schematic diagram of a powertrain for an automotive vehicle.

Referring first to FIG. 1, the powertrain for a motor vehicle 10 includes front wheels 12, 14 of a first wheel set, and rear wheels 16, 18 of a second wheel set, each wheel fitted with a tire. A power source 20, such as an internal combustion engine or an electric motor, is driveably connected to the first input 21 of a transaxle 22, which varies the speed and torque at the transmission first output 24 relative to the speed and torque at the output of the power source. The transmission 22 may be an automatic or manual transmission, which produces multiple discrete ratios of the speed of its output 24 divided by the speed of its input 21, or a continuously variable transmission, such as a traction drive or belt drive transmission, which varies the operating speed ratio steplessly.

The transmission output 24 is driveably connected directly to a front differential mechanism 26, which transmits power through front axle shafts 28, 30 differentially to the left and right front wheels 12, 14. The differential mechanism 26 produces a front axle speed ratio, which is the speed of the transaxle output 24 divided by the speed of the front axle shafts 28, 30, when they rotate at the same speed. The rotational speed of the front wheels is controlled by a brake system 31 comprising front brakes 32, 34, to which brake pressure from a source of pressurized brake fluid 36, such a master cylinder, is supplied in response to the depressed and released state of a brake pedal 38, which is controlled manually by the vehicle operator.

The transmission output 24 is also driveably connected to a front driveshaft 40, which transmits power to a torque biasing device (TBD) 42, whose output is driveably connected by an output component, i.e. a rear driveshaft 44 to a rear differential mechanism 46. The rear wheels 16, 18 are driveably connected by rear axle shafts 48, 50 to the output of the rear differential 46. The rear differential 46 may be a conventional mechanism that transmits torque to the left and right rear wheels and accommodates speed differential between the wheels. The rear differential mechanism 46 produces a rear axle speed ratio, which is the speed of the rear driveshaft 44 divided by the speed of the rear axle shafts 48, 50, when they rotate at the same speed. The rotational speed of the rear wheels 16, 18 is controlled by rear brakes 52, 54, to which brake pressure from the brake pressure source 36 is supplied in response to the state of the brake pedal 38.

Under normal forward driving conditions when the front brakes are applied, the wheel brake system delivers brake pressure that is approximately equal side-to-side and produces brake forces applied to the front left wheel $F_{LF}$ and front right wheel $F_{RF}$ that are approximately mutually equal. Under normal forward driving conditions, when the rear brakes are applied, the wheel brake system delivers brake pressure that is approximately equal side-to-side and produces braking forces applied to the rear left wheel $F_{LR}$ and to the rear right wheel $F_{RR}$ that are approximately mutually equal, but may be different in magnitude from the front brake forces. The result is balanced tire-to-road forces that produce little or no yaw moment about the vehicle center of gravity.

The magnitude of net rear wheel torque at the left and right rear wheels 16, 18, however, is also controlled differentially by the brake system 31 such that the magnitude of wheel brake torque applied at each rear wheel by the vehicle braking system is under control of a brake control module (BCM) 56. The BCM 56 controls the differential application of brake pressure to the rear brakes 52, 54 in accordance with determinations made during execution of a programmed control algorithm. The speed and torque transmitted to the left rear wheel 16 by left rear axle shaft 48 is determined by the magnitude of pressure in the left rear wheel brake 52. Similarly, the speed and torque transmitted to the right rear wheel 18 by right rear axle shaft 48 is determined by the magnitude of pressure in the right rear wheel brake 54.

Differential rear wheel brake torque is applied by the braking system in response to electronic command signals produced by a torque control module (TCM) 60 to enhance vehicle stability and to augment vehicle handling under various driving conditions. For example, over-steer and under-steer conditions can be corrected by regulating net wheel torque as described above. The TCM 60 communicates with both the BCM 56 and a powertrain control module (PCM) 62, which controls operation of the engine 20 and transmission 22.

The TBD 42 includes a coupler or brake 64, which includes an input 66, driveably connected to the front driveshaft 40, and an output 68, driveably connected to a gearset 70. The gearset's output is driveably connected to the rear driveshaft 44. The coupler/brake 64 alternately driveably connects and disconnects second input 66 and second output 68, in response to signals transmitted by the TOM 60. When the coupler/brake 64 is disengaged, the rear driveshaft 44 is disconnected from the front driveshaft 40, and there is no torque transfer through the coupler 64 or gearset 70. A residual drag torque across the coupler may be present; however, this residual torque would not be sufficient to drive the vehicle's wheels.

Figures 2, 3:
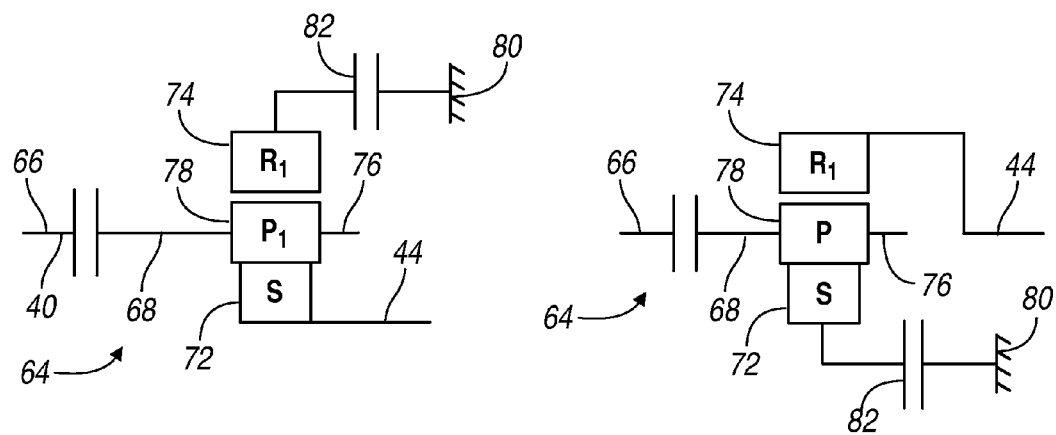
FIG. 2 is schematic diagram of a speed multiplying gearset for use in the powertrain of FIG. 1.
FIG. 3 is schematic diagram of a speed multiplying gearset for use in the powertrain of FIG. 1.

Preferably, gearset 70 is a planetary gearset, which increases the speed of the rear driveshaft or output component 44 in relation to the speed of the front drive shaft 40. FIG. 2 illustrates a preferred gearset, which includes a second component comprising a sun gear 72, an input element comprising a ring gear 74, a first component or planet pinion carrier 76, and first component comprising a set of planet pinions 78 supported on the carrier and engaged with the ring gear and sun gear. The carrier 76 is driveably connected to the output 68 of coupler 64, ring gear 74 is releasably grounded to a non-rotating grounded element or component 80 though a brake 82, and sun gear 72 is driveably connected to the rear driveshaft 44. Preferably, brake 82 is either fully engaged or partially engaged. When brake 82 is fully engaged and coupler 64 is engaged, sun gear 72 and driveshaft 44 are overdriven relative to the speed of carrier 76 and driveshaft 44, thereby producing the desired enhancement in vehicle handling. When coupler 64 is engaged, the magnitude of slip across brake 82 can be controlled such that the speed ratio of the front axle is substantially equal to the speed ratio of the rear axle.

FIG. 3 illustrates another gearset embodiment, in which the input element, sun gear 72, is fixed against rotation, the second component ring gear 74, is driveably connected to the rear driveshaft 44, and the first component carrier 76 driveably connected to the output 68 of coupler 64. When coupler 64 is engaged, ring gear 74 and driveshaft 44 are overdriven relative to the speed of carrier 76 and driveshaft 44.

In a positive torque condition, i.e., when power is transmitted from the engine to the wheels, the speed of front drive shaft 40 is determined by the engine/transmission output 24. When the TBD 42 is active, i.e., when coupler/brake 64 is engaged, the speed of rear driveshaft 44 is a multiple of the speed of front driveshaft 40, the multiple depending on the speed ratio produced by gearset 70. When the TBD 42 is active, preferably the speed of driveshaft 44 is greater than the speed of driveshaft 40.

When the TBD 42 is inactive, i.e., when coupler/brake 64 is disengaged, the speed of driveshaft 44 is determined by the speed of the rear axles 48, 50 and the drive ratio of the rear differential 46. The magnitude of torque transmitted to driveshaft 44 from driveshaft 40 is determined by the slip across TBD 42, which slip is a function of the magnitude of pressure applied to actuate the coupler/brake 64.

The speed and torque transmitted to axleshafts 48, 50 is determined by the magnitude brake torque in the respective wheel brakes 52, 54, which brake torque is a function of the magnitude of brake pressure applied to the brakes.

The rear differential 46 may be a conventional mechanism that transmits torque to the left and right wheels 16, 18 and accommodates speed differential between the wheels. However, the magnitude of net rear wheel torque at the left and right wheels will be controlled by varying the magnitude of wheel brake torque applied at each rear wheel by the vehicle braking system 56.

Differential rear wheel brake torque will be applied by the braking system 56 in response to an electronic command signal produced by the powertrain controller 62 as required to augment vehicle handling under current driving conditions. For example, over-steer and under-steer conditions can be corrected by regulating net wheel torque as described above.

A brake control algorithm is preferably located in the BCM 56, but it can be implemented in a central control module or any other module on the vehicle multiplex bus. The BCM 56 or another relevant module receives the following input signals produced from various sensors: engine speed, engine torque, throttle position, actual torque transferred, maximum possible torque transfer, speed of each wheel 12, 14, 16, 18, vehicle speed, yaw rate, lateral and longitudinal acceleration of the vehicle, and steering wheel angle. The brake control algorithm uses these inputs to calculate the desired torque at either the left or right rear wheel. To achieve the desired torque, the brake control algorithm produces the following command signals: commanded torque transfer, brake pressure to be supplied to the left rear brake 52, and brake pressure to be supplied to the right rear brake 54.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A powertrain for an automotive vehicle having first and second sets of wheels comprising:
    a power source;
    a transmission including a first input driveably connected to the power source and a first output driveably connected to the wheels of the first wheel set; and
    a torque biasing device including:
        a coupler having a variable torque transmitting capacity and including a second input and a second output, the second input being driveably connecting the first output, and
        a planetary gearset including a first component driveably connected to the second output, a brake having a variable torque transmitting capacity and including an input element of the gear set and a grounded element, a second component driveably connected to the input element, and an output component driveably connected to the wheels of the second wheel set.

2. The powertrain of claim 1 wherein:
the first component is a carrier that supports a set of planet pinions for rotation thereon, the second component is a sun gear in meshing engagement with the planet pinions, and the output component is a shaft connected with the sun gear.

3. The powertrain of claim 1 wherein:
the first component is a carrier that supports a set of planet pinions for rotation thereon, the second component is a ring gear in meshing engagement with the planet pinions, and the output component is a driveshaft connected with the ring gear.

4. The powertrain of claim 1 further comprising:
a second wheel set driveably connected to the output component; and
a wheel brake system for changing a magnitude of brake torque applied to a first wheel of the second wheel set relative to a magnitude of brake torque applied to a second wheel of the second said wheel set.

* * * * *